United States Patent [19]

Dufay

[11] 4,398,093

[45] Aug. 9, 1983

[54] CONVERTER FOR CONVERTING NON-LUMINOUS PHOTONS INTO LUMINOUS PHOTONS

[75] Inventor: Jean-Claude Dufay, Blois, France

[73] Assignee: Etat Francais, represente par le Ministere de l'Environnement et de Cadre de Vie, Laboratoire Central des Ponts et Chaussess, Paris, France

[21] Appl. No.: 176,996

[22] Filed: Aug. 11, 1980

[30] Foreign Application Priority Data

Aug. 14, 1979 [FR] France .............................. 79 20708

[51] Int. Cl.$^3$ ............................................. G01J 1/58

[52] U.S. Cl. ............................. 250/483.1; 250/487.1

[58] Field of Search ............... 250/483, 484, 486, 487, 250/488, 458

[56] References Cited

U.S. PATENT DOCUMENTS 3,163,765 12/1964 Niklas .

3,356,851 12/1967 Carlson .

3,872,309 3/1975 De Belder et al. ................ 250/483

4,195,228 3/1980 Rabatin ............................ 250/483

4,256,965 3/1981 Lucian ............................. 250/486

4,318,001 3/1982 Degenhardt ...................... 250/483

*Primary Examiner*—Alfred E. Smith

*Assistant Examiner*—Janice A. Howell

*Attorney, Agent, or Firm*—Balogh, Osann, Kramer, Dvorak, Genova & Traub

[57] ABSTRACT

The invention relates to a converter for converting non-luminous, so-called input photons such as X or $\gamma$ photons, into luminous photons, and to an installation for the non-destructive inspection of a material, employing this converter. The converter comprises a layer of luminophore disposed on the path of said non-luminous photons and, upstream of said layer of luminophore, with respect to the direction of displacement of the non-luminous photons, a metal foil in which said non-luminous photons are converted into non-luminous photons of lower energy, by collision (Compton effect) of said input photons on electrons of said metal foil. The invention is more particularly applicable to the non-destructive inspection of concrete structures.

7 Claims, 6 Drawing Figures

CONVERTER FOR CONVERTING NON-LUMINOUS PHOTONS INTO LUMINOUS PHOTONS

The present invention relates to a converter for converting non-luminous, so-called input photons such as X or $\gamma$ photons, into luminous photons, of the type comprising a layer of luminophore disposed on the path of said non-visible photons.

The invention also relates to an installation for the non-destructive inspection of material such as reinforced or prestressed concrete.

Radioscopic or gammascopic systems existing in the medical and industrial domain are stationary in operation; in fact, it is the object to be inspected or checked which moves in front of the inspection system, and these systems employ low- and average-energy X radiation: 10 keV to 200 keV. These systems mainly use an image intensifier (or brilliance amplifier) as X photon/-luminous photon converter. Such an element is relatively heavy and bulky, although of small diameter, and requires a high voltage supply. The image formed, available at the output of this intensifier, is analysed by a television camera and remotely displayed on a television screen.

This type of equipment gives good quality images only if the radiation used is of low- or average-energy and only if the inspected material is of low density and sparingly diffusing.

On the contrary, this same apparatus does not give satisfactory results if the radiation used is a high-energy X or $\gamma$ radiation (up to 10 MeV) the efficacy of conversion of the intensifier then not being high enough, and if the inspected material is dense and highly diffusing (case of concrete).

It is therefore a first object of the present invention to propose a converter having a satisfactory efficacy for input photons of energy higher than 200 KeV.

It is also an object of the present invention to propose a device- or installation—for the non-destructive inspection by radioscopy or gammascopy giving good quality images over concrete which is as thick as possible, whilst being able to use the same sources of radiation as in conventional gammagraphy (Ir 192 and Cobalt 60). Moreover, the proposed device being intended for use in situ, components should be selected which are of low weight, small dimensions and high mechanical strength, with the minimum of limitations as regards the electrical supplies necessary for functioning.

The converter according to the invention and as shown in FIGS. 1-6 is in the form of an independent screen, and is characterised in that it further comprises, upstream of said layer of luminophore, with respect to the direction of displacement of the non-luminous input photons, a metal foil in which said non-luminous photons are converted into non-luminous photons of lower energy, by collision (Compton effect) of said high-energy photons on electrons of said metal foil.

The energy of the non-luminous photons is advantageously substantially included between 200 keV and 10 MeV.

The thickness of the metal foil is advantageously between 100 and 500 $\mu$m.

The metal foil advantageously comprises at least one of the following metals: lead, gold.

A light-reflecting layer is advantageously disposed immediately upstream of the layer of luminophore.

The light-reflecting layer is advantageously made of titanium oxide.

The non-destructive inspection installation according to the invention is characterised in that it comprises: a source of non-luminous photon radiation directing a flux of said radiation onto the material to be inspected, a lead filter disposed downstream of this material to stop the low-energy radiation coming from the diffusion in said material of the radiation issuing from the source, a converter as described hereinabove, to convert the photons issuing from said filter into luminous photons, a mirror inclined with respect to the path of said luminous photons to receive these photons and direct them onto the inlet lens of a television camera, and an image display device receiving the video signal furnished by said camera.

The source advantageously contains at least one of the following radio-active substances: Iridium 192 and Cobalt 60.

The source, on the one hand, and the detection assembly comprising the converter, the mirror and the television camera, on the other hand, are advantageously each associated with respective displacement means for displacing them in at least two spatial directions, these displacement means being remotely controllable.

The invention will be more readily understood on reading the following description with reference to the accompanying drawings, in which.

Figure 1:
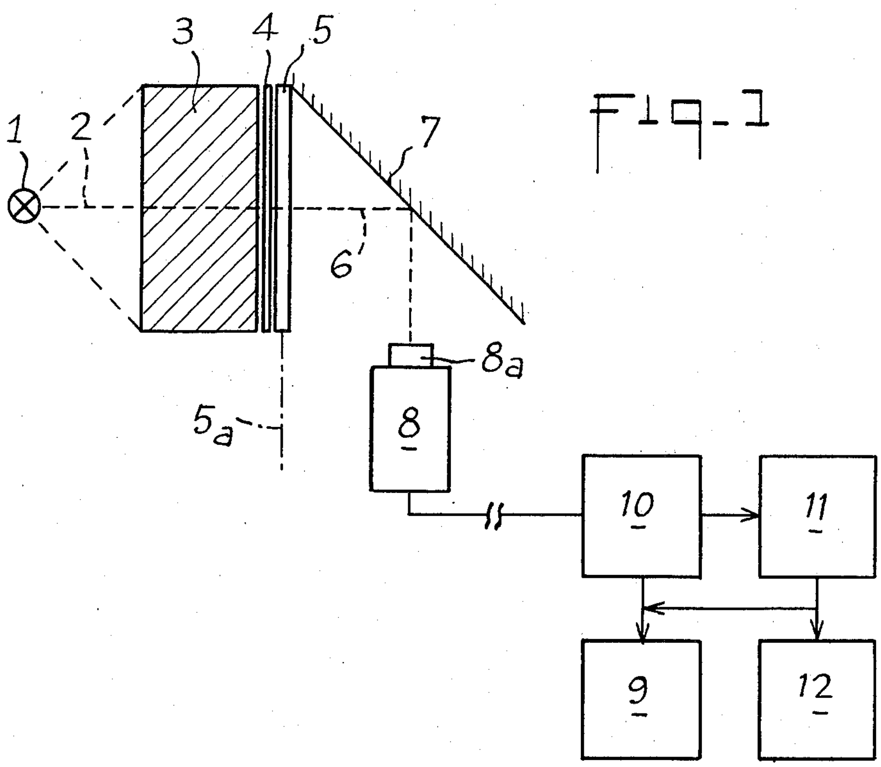
FIG. 1 is a diagram of a non-destructive inspection installation according to an embodiment of the invention.

Referring now to the drawings, the installation shown therein comprises: a source of X or $\gamma$ radiation 1 directing a beam of high-energy radiation 2 towards a mass of reinforced or prestressed concrete 3 to be inspected, a lead filter 4 stopping the low-energy radiation coming from the diffusion in the material 3 of the radiation 2 issuing from the source 1, a converter 5 converting the X or $\gamma$ photons issuing from the filter 4 into luminous photons 6 forming an image of suitable format, for example 30 cm×40 cm, a mirror 7 disposed at 45° with respect to the plane *5a* of the converter 5, this mirror receiving the light 6 supplied by the converter 5 and having a high coefficient of reflection, for example of 0.97, for the emission wavelength of the converter 5, a television camera 8 analysing line by line the image reflected by the mirror 7, this camera 8 preferably being at low light level and being equipped with an optical lens 8*a* of high luminosity and large aperture, for example opening at f/0.95, and a display device—or monitor—9 visualising the image obtained from the video signal which is supplied by the camera 8 and which, if need be, is previously processed in a memorisation-integration unit 10 for improving the signal-to-noise ratio. This image may also be recorded either on a magnetoscope 11 or on a graphic video image recorder 12.

The radiation furnished by the source 1 is preferably of energy comprised between 200 keV and 10 MeV.

This source 1 may be a source of Cobalt 60 or Iridium 192, alternatively, this source may be of the type comprising an accelerator directing a flux of electrically charged particles onto a target.

The non visible-$\gamma$ or visible-X converters generally have a very low efficiency—or yield—as soon as the energy of the X or $\gamma$ photons exceeds 200 keV. It was therefore excluded to use one of these converters in the presently described inspection and/or checking installation.

Figure 2:
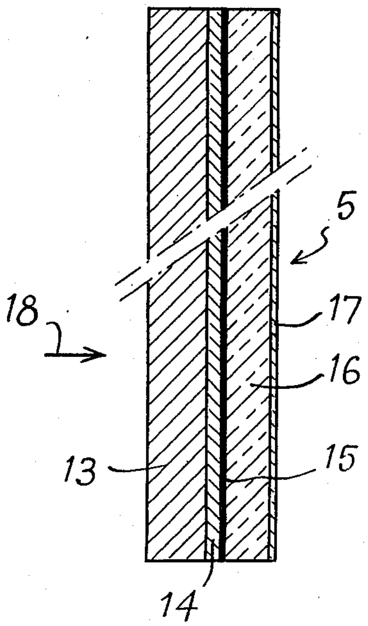
FIG. 2 is a view in transverse section of the converter used by the installation of FIG. 1.

The converter shown in FIG. 2 has the advantage of giving, from high-energy X or $\gamma$ photons, an image of sufficient quality for seeking defects in concrete. In addition, such a converter is not fragile, it is simple to use and, in particular, does not require complicated electronic equipment, and it is not thick, is light, and available—or easy to make—in dimensions identical to those of radiographic films currently used: 30 cm$\times$40 cm.

This converter comprises, contiguously and from left to right in FIG. 2, a cardboard support 13, a metal foil of lead or gold 14, about 250 $\mu$m thick, disposed on one face of said support 13, a reflecting layer 15 of titanium oxide $TiO_2$, about 10 $\mu$m thick, a fluorescent layer 16 of ZnS Cd: Ag, about 1000 $\mu$m thick and a protecting layer 17 about 10 $\mu$m thick.

The inspection or checking installation which has just been described functions as follows:

The $\gamma$- or X-photons issuing from the material 3 to be inspected are converted into visible light by the converter 5: the image thus formed on this converter is taken up by the mirror 7 of high coefficient of reflection (0.97), for the emission wavelength of the converter 5, and analysed by the low light level television camera 8. The video signal issuing from the camera 8 forms, at a distance, the desired image on the television screen 9. This image may be recorded either on the magnetoscope 11 for subsequent examination or on the graphic video image recorder 12 for filing or insertion in a file. The quality of the image obtained may be improved at the output of the camera 8 by the memorisation-integration unit 10 (improvement of the signal-to-noise ratio, i.e. of the contrast).

The converter 5 shown in FIG. 2 functions as follows:

The $\gamma$- or X-radiation 18 issuing from the material 3 to be inspected penetrates into the metal lead or gold foil 14, disposed on the cardboard support 13 which gives it a sufficient rigidity. The metal foil 14 creates by diffusion (Compton effect) diffused low-energy photons and electrons, of which the sum is substantially equal to the primary energy. These diffused electrons and photons emerge from the metal foil 14 and penetrate into the fluorescent layer 16 of ZnSCd:Ag, 1020 $\mu$m thick. This latter then emits a visible fluorescent light. Since a part of the light thus created is directed rearwardly, it is provided a reflecting layer 15 of titanium oxide of thickness 10 $\mu$m, for returning the light forwards and therefore improving the luminosity of the converter. Finally, the protective layer 17 of 10 $\mu$m ensures a good resistance to dust, scratches, etc. for this converter.

This type of converter-screen typically presents an improvement in luminosity of 12.8% with respect to a known medical fluorescent screen used under the same conditions. The contrast is increased by 12%. Other measurements have also shown that the luminosity of this screen is mainly produced by the primary radiation issuing from the material to be inspected whilst in the case of the known medical screen, this luminosity is due mainly to the diffused radiation.

The limiting resolution of the complete chain of FIG. 1 is that of the converter, or lp/mm with 4% of contrast (lp/mm=lines pair/mm).

The so-called televised radioscopy chain thus constituted typically gives perfectly exploitable images up to a thickness of concrete of 45 cm for a source of Cobalt 60 of 250 Ci, and 1 m thickness for a linear accelerator delivering 700 rad/min at 1 m with 10 MeV.

This televised radioscopy chain is advantageously applied to quality control of the injections of concrete and to the positioning of the steel prestressing cables in the concrete.

To effect this inspection, the source 1 and the detector assembly 4 and 5, 7 and 8, designated hereinafter by reference 19, must move in synchronism on either side of the concrete wall 30 to be inspected. This will be effected by a "sight control" of the assembly according to the principle of FIG. 3.

Figure 3:
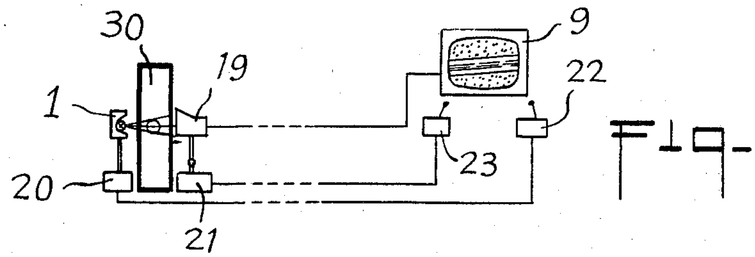
FIG. 3 is a diagram of a first embodiment of the installation of FIG. 1.

According to the diagram of FIG. 3, the source 1 and detection sub-assembly 19 are each associated with means, respectively 20 and 21, for displacement thereof in directions X and Z or X, Y and Z. The means 20 and 21 are each remotely controlled by a respective manual control device 22 and 23.

Figure 4:
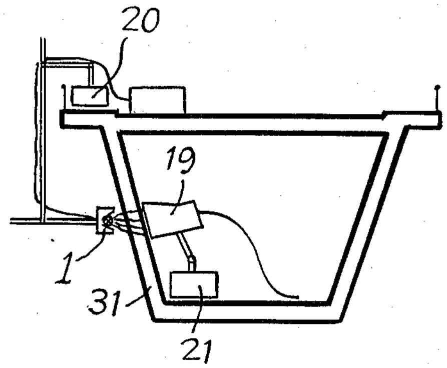
FIG. 4 is a diagram of a second embodiment of the installation of FIG. 1.
Figure 5:
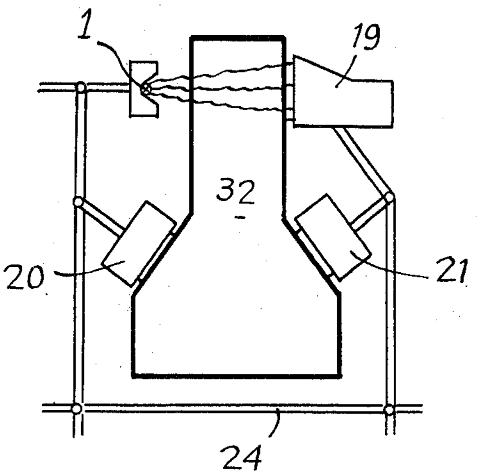
FIG. 5 is a diagram of a third embodiment of the installation of FIG. 1.
Figure 6:
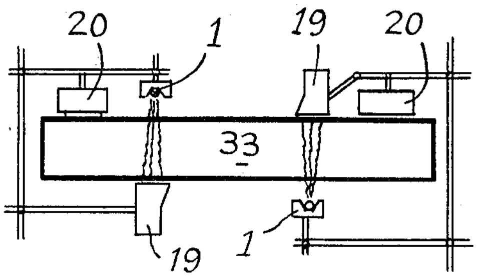
FIG. 6 is a diagram of a fourth embodiment of the installation of FIG. 1.

The use of the inspection chain on the three main types of concrete structure is illustrated in FIG. 4 (box bridge), FIG. 5 (girder bridge) and FIG. 6 (slab bridge). For the latter type of structure, the source 1 is preferably a linear accelerator. In FIGS. 3 to 6, like elements are designated by like references. FIG. 6 shows two modes of arrangement of the inspection chain on its right-hand and left-hand halves;

It should be noted that, according to FIGS. 3 and 4, the displacement means 20 and 21 are mechanically independent of each other, whilst, according to FIG. 5, these means are connected together by a structural element 24. According to FIG. 6, one sole displacement means 20 ensures the displacement of the units 1 and 19.

The so-called high-energy televised radioscopy installation which has just been described is mainly intended for inspecting structures made of prestressed concrete, from a high-energy X or $\gamma$ radiation (preferably from 200 keV to 10 MeV). It employs a special fluometallic converter especially studied and manufactured for this installation.

However, the above given use of this installation is in no way limiting. The televised radioscopy chain described may also find application whenever a virtually instantaneous display of defects inside a more or less dense material is necessary, from high-energy X or $\gamma$ radiation (for example in the building, wood, metallurgical industry, etc.) and wherever a limiting resolution of 1 lp/mm with 4% contrast is sufficient.

What is claimed is:

1. In a converter for converting non-luminous input photons, such as X or $\gamma$ photons, into luminous photons, said converter being designed for use in combination with an optical transmitting device and an image display device, said converter being in the form of an independent screen, comprising a support layer, a metal foil in which said non-luminous input photons are converted into non-luminous photons of lower energy, by collision of said input photons on electrons of said metal foil, and a layer of luminophore in which said non-luminous photons of lower energy are converted into luminous photons, the improvement comprising a light-reflecting layer of titanium oxide interposed between said metal foil and said layer of luminophore so as to enhance the luminosity of the converter.

2. The converter of claim 1, wherein the energy of the non-luminous input photons is substantially between 200 KeV and 10 MeV.

3. The converter of claim 1, wherein the thickness of the metal foil is between 100 and 500 μm.

4. The converter of claim 1, wherein the metal foil comprises at least one of the following metals: lead, gold.

5. The converter of claim 1, wherein the light-reflecting layer has a thickness of about 10 μm.

6. The converter of claim 1, wherein the luminophore layer is made of ZnS Cd: Ag with a thickness of between 600 and 1500 μm.

7. The converter of claim 1, wherein the luminophore layer is made of ZnS Cd: Ag with a thickness of about 1000 μm.

* * * * *